Patented Feb. 18, 1930

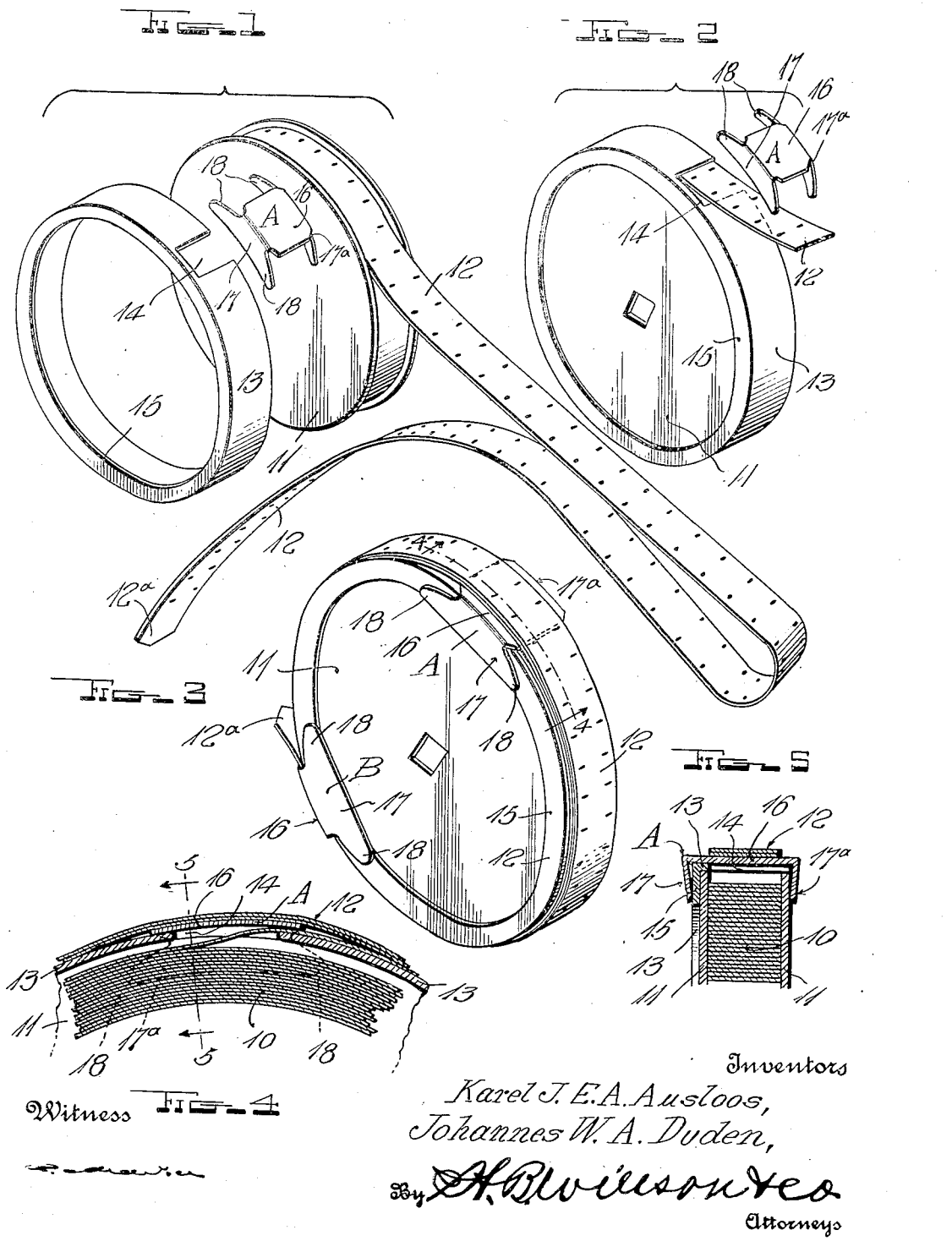

1,747,656

UNITED STATES PATENT OFFICE

KAREL JOZEF EUGEEN ALFONS AUSLOOS, OF SCHAARBEEK, AND JOHANNES WILLEM ANTOON DUDEN, OF OUDE GOD, NEAR ANTWERP, BELGIUM, ASSIGNORS TO GEVAERT PHOTO PRODUCTEN NAAMLOOZE VENNOOTSCHAP, OF OUDE GOD, BELGIUM

FILM-PROTECTING METHOD AND MEANS

Application filed March 18, 1929, Serial No. 348,110, and in Belgium August 17, 1928.

The invention relates to light-excluding film packages for motion picture cameras, to a unique method of preparing such packages at either the industrial or the amateur laboratory, and to a novel method of loading the camera without subjecting the sensitized film to injurious light. The primary intent is the practicing of the invention in connection with films for amateur use, but it is not restricted to this field.

Heretofore, the reel-carried film has been placed in a closed magazine composed of two telescopic sections slotted to receive the extremity of the usual lead strip of the film. The user in loading the camera, removes one half of the magazine, places the reel, the film and the other half of the magazine in the camera as a single unit, unwinds the lead strip by pulling it from the reel and threads this strip through the camera, removes said other half of the magazine and promptly closes the camera. This procedure, if carried out with extreme care, in most instances, effects loading of the camera without edge-fogging of the film but when unwinding the lead strip and threading it through the camera, there is severe danger of the aforesaid other half of the magazine becoming displaced and admitting light in injurious quantity.

It is one object of our invention to provide novel method and means whereby the film package has a sufficient length of the lead strip for threading, wrapped around the exterior of an improved light-excluding means so that the necessary length of said lead strip is readily accessible for threading, without first removing any portion of said light-excluding means and without pulling the lead strip through said light-excluding means, the latter remaining upon the reel until the camera is to be closed.

A further aim is to provide for holding the light-excluding means upon the reel until the camera has been threaded and is to be closed.

The light-excluding means possesses an opening through which the lead strip passes, and it is another object to provide for the closing of this opening until the camera has been threaded and is to be closed, and in this connection, a still further aim is to make provision whereby the same means which holds the light-excluding means upon the reel, also closes said opening.

Another object is to provide for connection of the inner portion of the aforesaid lead strip length with the light-excluding means until threading has been accomplished and the camera is to be closed.

Yet another object is to provide an improved structure involving simplification and decreased cost of manufacture without loss of efficiency or other advantage.

With the foregoing in view, the invention resides in the novel subject matter hereinafter described and claimed, the description being supplemented by the accompanying drawings illustrating only the preferred embodiment of the invention.

Fig. 1 is a disassembled perspective view showing the reeled film with its lead strip extending from the reel for wrapping about the light-excluding means, and illustrating said light-excluding means and the reel in juxtaposition.

Fig. 2 is a perspective showing the light-excluding ring applied to the reel, the lead strip passing through the opening of said ring, and the clip —A— in readiness for performing the triple function of closing said opening, connecting the lead strip with the ring and connecting the latter with the reel.

Fig. 3 is a perspective showing the film package in condition for either direct or delayed conveyance to the camera.

Fig. 4 is a sectional view on line 4—4 of Fig. 3.

Fig. 5 is a transverse sectional view on line 5—5 of Fig. 4.

In preparing the package at the laboratory, the sensitized film 10 is protected against light and wound in the usual way upon a reel 11 whose sides are imperforate throughout their film-engaging areas. A sufficient length 12 of the film lead strip is left free from the reel to later permit threading of the camera before removing any portion of the light-excluding means, and obviously this lead strip may either be a separate strip fastened to the film or a non-sensitive end portion of the latter integral therewith.

After winding as explained and while the film is still protected against an injurious amount of light, a light-excluding closure is engaged with the reel around the wound film, the lead strip length 12 being left at the exterior of the light-excluding means. This length 12 is then wound completely around the light-excluding means until said length is completely taken up. The package in this condition protects the film against light and is in readiness either for direct carrying to the camera, or for market and subsequent use.

When the camera is to be loaded, it is opened and prepared for film reception in the usual way. The end 12 of the lead strip is unwound or itself permitted to unwind from the light-excluding means, and the film, reel and light-excluding means are then bodily inserted into the camera, the reel being placed upon the usual shaft. The free length 12 of the lead strip is now threaded through the camera and engaged with the take-up reel, during which procedure the light-excluding means remains in operative position and protects the film against light. The light-excluding means is now removed and the camera immediately closed.

Having the lead strip length 12 exposed and accessible is not only more convenient, but threading it through the camera without pulling it from the reel through an opening of the light-excluding means, overcomes danger of displacing the latter while threading the camera and consequently the edge-fog hazard is reduced to the minimum.

After use of the film, it may be taken from the camera without danger of injury from light by a reversal of the above described loading steps, in connection with the reel upon which it is then wound.

Preferably, the method of package preparation, embodies the additional step of closing a lead-strip-receiving-opening of the light-excluding means before winding the length 12 of the lead strip, so that the latter will pass also around the closing means of said opening and this closing means will not be accessible for removal until the length 12 has been unwound for threading through the camera. Then too, said method of package preparation preferably embodies connection of the inner portion of the lead strip length 12 with the light-excluding means and connection of said light-excluding means with the reel 11 in such manner that the connections may be readily released when loading the camera.

When any of the additional package preparation steps described in the preceding paragraph are followed, the method of loading embodies additional steps also. The closing means for the lead-strip-receiving-opening is removed after threading of the lead strip through the camera, and removal of said closing means and the film-encircling light-excluding means is not effected until immediately before closing the camera and hence said closing means overcomes any possibility of even a small amount of edge-fogging by entrance of light through said opening. When the package embodies the length 12 connected at its inner portion with the light-excluding means and the latter connected with the reel, the loading method embodies the release of the connecting means after the lead strip length 12 has been threaded through the camera, and by release only at that time, any liability of difficulty which might otherwise be encountered, is obviated.

The preferred elements of construction used in the package-preparation portion of our method, existing in the novel package, and hence used in carrying out the camera-loading portion of said method, are shown in the accompanying drawing and will be rather specifically described, with attention invited to the fact however, that these elements are to a large extent illustrative rather than limiting.

A light-excluding ring 13 of any appropriate material (for instance sheet metal or cardboard) is provided, of such internal circumference and such width as to surround the reel 11 and contact with the peripheral edges of both sides of said reel. This ring 13 is formed with a lead-strip-receiving-opening or slot 14 which opens through one of its edges, and the other edge of said ring is provided with means to abut one side of the reel 11, said means preferably consisting of a narrow, inwardly projecting, continuous flange 15. After winding the film and the desired portion of its lead strip upon the reel 11, the ring 13 is slipped edgewise into position around the reel as seen in Fig. 2, the lead strip then passing through the opening 14. A spring clip —A— of unique form is then placed in position to perform the triple function of closing the opening 14, connecting the inner portion of the lead strip length 12 with the ring 13 and connecting this ring with the reel 11. This having been done, the lead strip length 12 is wound the necessary number of times around the ring 13. After so winding the lead strip length 12, the reel and its light-protected film may be slipped into a cardboard box and the latter relied upon to prevent accidental unwinding of said length 12. Preferably however, before boxing, the free end 12ª of the aforesaid length 12 is anchored, by a sticker if desired, but preferably by a second spring clip —B—. This clip may be of the same construction as clip —A— and in addition to anchoring the strip end 12ª, said clip —B— further connects the ring 13 with the reel 11. The preferred complete package with the lead strip length 12 wound about the ring 13 and the clip —A— and having its free end anchored by the clip —B—, is shown in Fig. 3.

Each clip A—B in the present showing embodies a rectangular plate 16 curved in substantial conformity with the peripheral edges of the reel 11 and of a width substantially equivalent to but preferably slightly greater than the side-to-side dimension of said reel. The curved edges of the plate 16 are bent laterally in the same direction to provide two resilient flanges 17—17a. Flange 17 contacts with the flange 15 of ring 13 and flange 17a abuts the side of the reel 11 opposite said flange 15. The flange 17—17a preferably converge slightly toward their free edges to obtain an effective grip and if desired their ends may extend somewhat beyond the plate 16 as shown at 18.

When a film, packaged as seen in Fig. 3 and hence fully protected against light, is to be used, the camera is opened and prepared as usual for film reception. The clip —B— is removed and if the lead strip length 12 does not immediately uncoil, it is completely unwound by hand. The package, otherwise unaltered, is now properly placed in the camera and the lead strip length 12 is easily threaded and engaged with the take-up reel without the necessity of molesting any parts of the light-excluding means. After threading, clip —A— is removed, ring 13 is removed and the camera is immediately closed. By following these steps, the film is in readiness for feeding upon operation of the camera and all portions of said film have been protected against injury from light.

After exposure of the film and the concurrent winding thereof on the take-up reel, it may be restored to the packaged form of Fig. 3 incident to removal from the camera, by reversing the above described loading steps in connection with the said take-up reel.

We claim:—

1. In a method of protecting a sensitized film against light, the steps of light-protectedly winding the film but not all of its lead strip upon a reel, peripherally closing the reel and leaving a length of the lead strip at the exterior of the closure, and winding said length of the lead strip completely around said closure.

2. In a method of protecting a sensitized film against light, the steps of light-protectedly winding the film but not all of its lead strip upon a reel, peripherally closing the reel and passing the lead strip through an opening in the closure, closing said opening and connecting the lead strip with said closure, and winding the free outer portion of the lead strip completely around the closure and the means which closes said opening and connects said lead strip with said closure.

3. In a method of protecting a sensitized film against light, the steps of light-protectedly winding the film but not all of its lead strip upon a reel, peripherally closing the reel and passing the lead strip through an opening in the closure, closing said opening and simultaneously connecting the lead strip with said closure, and winding the free outer portion of the lead strip completely around the closure and the means which closes said opening and connects said lead strip with said closure.

4. In a method of protecting a sensitized film against light prior to use, the steps of conveying the reeled film to the camera within the confines of a reel periphery closure with a length of the film lead strip wound around said closure; inserting the peripherally closed reel and the light-protected film into the camera, threading the aforesaid length of the lead strip through the camera, removing the peripheral closure from the reel, and immediately closing the camera.

5. In a method of protecting a sensitized film against light prior to use, the steps of conveying the reeled film to the camera within the confines of a reel periphery closure with the film lead strip passing through a light-closed opening of said closure and wound around said closure and the closing means of its opening; inserting the reeled light-protected film into the camera, threading the lead strip through the camera, then removing the closing means of said opening and the reel periphery closure, and immediately closing the camera.

6. The method of protecting a sensitized film against light prior to use, comprising the steps of light-protectedly winding the film but not all of its lead strip upon a reel, peripherally closing the reel against light entrance and leaving a length of the lead strip at the exterior of the closure, winding said length of the lead strip around the closure; conveying the peripherally closed reel and the light-protected film and inserting as a unit into the camera, threading the aforesaid length of the lead strip through the camera, then removing the peripheral closure of the reel, and immediately closing the camera.

7. In a method of protecting a sensitized film against light prior to use, the steps of light-protectedly winding the film but not all of its lead strip upon a reel, peripherally closing the reel and passing the lead strip through an opening in the closure, closing the opening of the closure and connecting the lead strip with said closure, winding the free outer portion of the lead strip around said closure and the closing means of its opening; conveying the reeled light-protecting film to the camera and inserting it, threading the lead strip through the camera then removing the means which closes said opening and freeing the lead strip from said closure, removing said closure and immediately closing the camera.

8. In a method of protecting a sensitized film against light prior to use, the steps of light-protectedly winding the film but not all of its lead strip upon a reel, peripherally closing the reel and passing the lead strip through an opening in the closure, closing the opening of the closure and simultaneously connecting the lead strip with said closure, winding the free outer portion of the lead strip around said closure and the closing means of its opening; conveying the reeled light-protected film to the camera and inserting it, threading the lead strip through the camera, then removing the means which closes said opening and freeing the lead strip from said closure, removing said closure, and immediately closing the camera.

9. A film package for daylight loading comprising a reel having closed sides, a sensitized film wound on said reel and having a lead strip, a length of the latter being left free from the reel, and a light-excluding closure engaged with the reel around the wound film, said closure having an opening through which said lead strip passes, said length of said lead strip being wound completely around said light-excluding closure and being hence accessible for threading through a camera before removing said closure.

10. A film package for daylight loading, comprising a reel having closed sides, a sensitized film wound on said reel and having a lead strip, a length of the latter being left free from the reel, and a light-excluding closure engaged with the reel around the wound film, said closure having an opening through which said lead strip passes, means closing said opening, said length of said lead strip being wound completely around the first named closure and said closing means and hence being accessible for threading through a camera before removing either said closing means or said closure.

11. A film package for daylight loading, comprising a reel having closed sides, a sensitized film wound on said reel and having a lead strip, a length of the latter being left free from the reel, a light-excluding closure engaged with the reel around the wound film and having an opening through which said lead strip passes, and a second closure for said opening, said length of said lead strip being wound completely around the first and second named closures and hence being accessible for threading through the camera before removing either of said closures, said second closure having means frictionally engaging the reel to hold it against accidental removal upon unwinding of said length of said lead strip.

12. A film package for daylight loading, comprising a reel having closed sides, a sensitized film wound on said reel and having a lead strip, a length of the latter being left free from the reel, a light-excluding ring surrounding the reel and contacting with its peripheral edges, said ring having a slot opening through one of its edges through which said lead strip passes, the other edge of said ring having means to abut one side of the reel, said length of lead strip being wound completely around said ring and being therefore accessible for threading through a camera before removal of said ring, and means for holding said ring against accidental removal.

13. A film package for daylight loading, comprising a reel having closed sides, a sensitized film wound on said reel and having a lead strip, a length of the latter being left free from the reel, a light-excluding ring surrounding the reel and contacting with its peripheral edges, said ring having a slot opening through one of its edges through which said lead strip passes, the other edge of said ring having means to abut one side of the reel, said length of lead strip being wound completely around said ring and being therefore accessible for threading through a camera before removal of said ring, and means under said wound lead strip length for holding said ring against accidental removal.

14. A structure as specified in claim 13; said means closing said slot.

15. A film package for daylight loading, comprising a reel having closed sides, a sensitized film wound on said reel and having a lead strip, a length of the latter being left free from the reel, a light-excluding ring surrounding the reel and contacting with its peripheral edges, said ring having a slot opening through one of its edges through which said lead strip passes, the other edge of said ring having means to abut one side of the reel, said length of lead strip being wound completely around said ring and being therefore accessible for threading through a camera before removal of said ring, and a spring clip under said wound lead strip length and straddling said ring for holding the latter against accidental removal, said clip engaging the side of the reel at said one edge of the ring.

16. A structure as specified in claim 15; said spring clip having a portion which closes said slot.

17. A film package for daylight loading, comprising a reel having closed sides, a sensitized film wound on said reel and having a lead strip, a length of the latter being left free from the reel, a light-excluding ring surrounding the reel and contacting with its peripheral edges, said ring having a slot opening through one of its edges through which said lead strip passes, the other edge of said ring having means to abut one side of the reel, said length of lead strip being wound completely around said ring and being therefore accessible for threading through a camera before removal of said ring, and common means holding said lead strip length against unwinding and holding said ring around the reel.

18. A film package for daylight loading, comprising a reel having closed sides, a sensitized film wound on said reel and having a lead strip, a length of the latter being left free from the reel, a light-excluding ring surrounding the reel and contacting with its peripheral edges, said ring having a slot opening through one of its edges through which said lead strip passes, the other edge of said ring having means to abut one side of the reel, said length of lead strip being wound completely around said ring and being therefore accessible for threading through a camera before removal of said ring, and a spring clip straddling said lead strip length and said ring and having a portion engaging the side of the reel at said one edge of the ring, thereby holding the lead strip against unwinding and holding the ring upon the reel.

19. In a light-excluding means for film protection, a ring to surround and contact with the peripheral edges of a reel, said ring having a lead strip slot which opens through one of its edges and being provided with means at its other edge to abut one side of the reel, and a spring clip of a width to straddle said ring and engage the other side of the reel to hold the ring in place.

20. In a light-excluding means for film protection, a ring-holding clip comprising a plate curved in substantial conformity with the circular outline of a film reel and of a width substantially equivalent to the side to side dimension of the reel, said plate being provided along its curved edges with resilient flanges, one of which is adapted to engage the ring and the other of which is adapted to engage a side of the reel.

In testimony whereof, we have hereunto affixed our signatures.

KAREL J. E. A. AUSLOOS.
JOHANNES W. A. DUDEN.